A. D. SHREVE.
HOLDER FOR DISINFECTANTS.
APPLICATION FILED AUG. 10, 1916.

1,238,349.

Patented Aug. 28, 1917.

Inventor
A. D. Shreve.

By
Attorneys

UNITED STATES PATENT OFFICE.

AARON D. SHREVE, OF KEARNEY, NEBRASKA.

HOLDER FOR DISINFECTANTS.

1,238,349. Specification of Letters Patent. Patented Aug. 28, 1917.

Application filed August 10, 1916. Serial No. 114,251.

*To all whom it may concern:*

Be it known that I, AARON D. SHREVE, a citizen of the United States, residing at Kearney, in the county of Buffalo and State of Nebraska, have invented certain new and useful Improvements in Holders for Disinfectants, of which the following is a specification.

My invention relates to new and useful improvements in holders for disinfectants, the primary object of my invention being the provision of a receptacle or holder for liquid disinfectants, such as are employed in protecting poultry from lice and other vermin.

Primarily, one of the chief objects of the invention consists in providing a holder capable of being disposed upon the floor of a poultry house adjacent the opening left in the wall of the house for the passage of the poultry in such a manner that the hens or other poultry in entering and leaving the house will be forced to step into the pan and, consequently, into the disinfectants contained therein.

The disinfectants employed will preferably be of an oily nature, with the result that the roosts will become oiled by the oil carried by the feet of the hens. Furthermore, any heat from the bodies of the hens will cause the oil thus collected to give off fumes to drive away lice and other insects.

A further object of my invention consists in providing the holder with a false bottom of perforated or foraminous material which is normally supported above the surface of the liquid disinfectant contained in the holder so as to keep feathers, straw and other dirt from accumulating in the liquid and also to prevent the hens or chickens from drinking the disinfectant, this false bottom being supported by springs or other suitable means so that it will be depressed by the weight of a hen stepping upon it.

With these and other objects in view, my invention will be more fully described, illustrated in the accompanying drawings, and then specifically pointed out in the claims which are attached to and form a part of this application.

In the drawings.

Corresponding and like parts are referred to in the following description and indicated in all the views of the drawings by the same reference characters.

My improved disinfectant holder includes an open pan or container 10, preferably formed of sheet metal, tinned, galvanized or otherwise coated to protect it from rust or corrosion. This pan is preferably, although not necessarily, rectangular in shape and its walls 11 either extend vertically or are flared outwardly somewhat, their upper edges being bent outwardly about a marginal reinforcing wire 12 to give strength to the pan construction and to present a neat and smooth edge.

Figure 1:
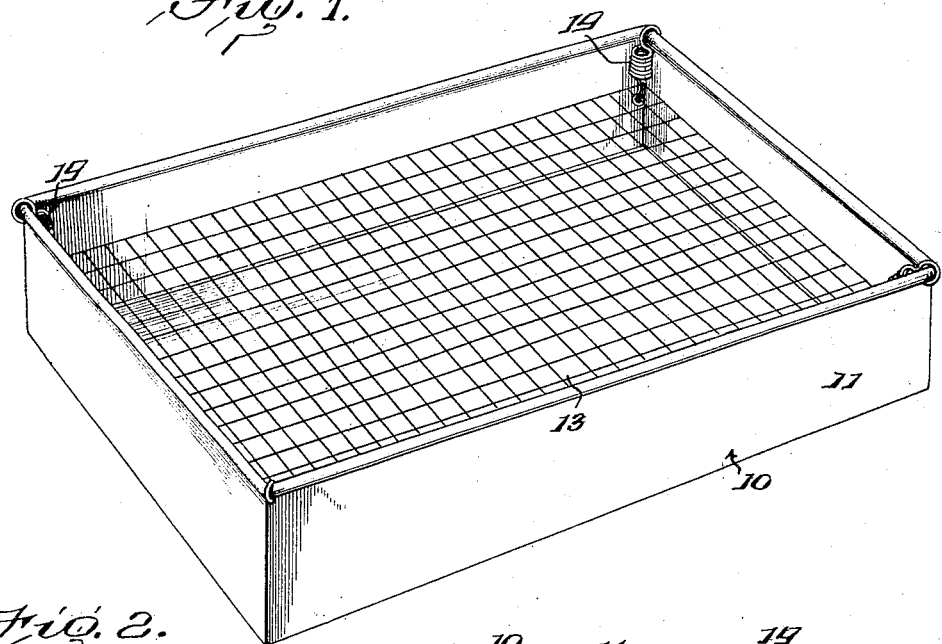
Figure 1 is a perspective view of my improved holder for disinfectants.
Figure 2:
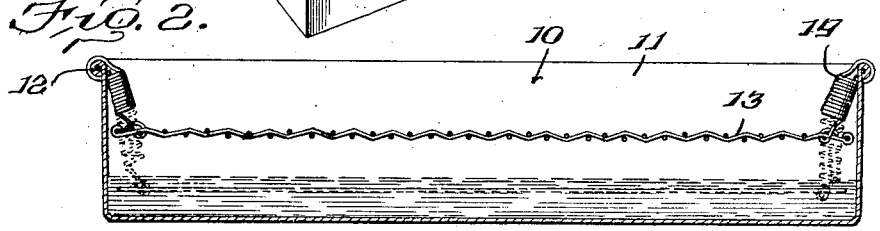
Fig. 2 is a longitudinal sectional view.
Figure 3:
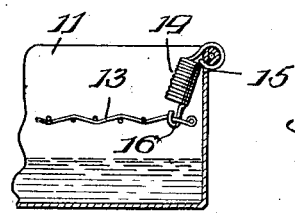
Fig. 3 is a fragmentary sectional view showing the manner of supporting the false bottom.

Positioned within the receptacle is a false bottom 13 which may be of perforated sheet metal but which is preferably formed of wire netting of relatively fine mesh, as shown. This false bottom is usually of slightly less size than the bottom of the receptacle and is supported above the bottom of the pan by means of a plurality of helical springs 14 or other equivalent means. As best shown in Fig. 3 of the drawings, the pan at each corner is formed with an opening 15 immediately below the reinforcing wire 12 and one end of each spring is passed upwardly over the edge of the pan and inwardly through this opening, the opposite end of the spring being bent to provide a hook 16 engaging certain of the wires of the false bottom forming screen.

In use, the pan is filled with a suitable liquid disinfectant to a level slightly below the normal level of the false bottom and is placed in such a position that all hens or other poultry must pass over it from time to time. Any hen stepping upon the false bottom depresses it to such an extent that the feet become moistened with the disinfectant, the springs of course returning the false bottom to raised position as soon as the weight of the hen is removed.

Obviously, various minor changes in details of construction may be made and I therefore reserve the right to make any alterations which may fall within the scope of the appended claims.

Having thus described the invention, what is claimed as new is:

1. A disinfectant holder including an open receptacle of sheet material having side, end and bottom walls, a reinforcing wire extending around the receptacle, the upper edges of the walls being bent about the wire and thereby stiffened, a foraminous false bottom located within the receptacle, and springs formed at their lower ends with hooks detachably engaging the corner portions of the false bottom, the opposite ends of the springs being passed upwardly about the upper edge of the receptacle at its corners and bent inwardly beneath the portions of the receptacle bent about the wire and passed through the walls of the receptacle whereby the springs are supported by and permanently connected to the wire reinforced walls of the receptacle and yet may be swung out of it when the false bottom is removed to facilitate cleaning, and whereby the springs support the false bottom so that normally both the false bottom and springs may be above the liquid level in the receptacle and so that the space below the false bottom is, consequently, unobstructed.

2. A disinfectant holder including a substantially rectangular receptacle, a false bottom of foraminous material fitting within the receptacle, and helical springs connecting the false bottom to the receptacle and supporting it in spaced relation to the bottom of the receptacle, each spring having its lower convolution extended to provide an open hook engaging about the juncture of crossing strands of the foraminous false bottom near the corner of such false bottom and having its upper convolution extended to provide a closed eye which engages about the upper portion of the corner of the receptacle passing through an opening formed in the corner of the receptacle adjacent its upper edge and encircling the portion of the receptacle between such opening and edge, the body of each spring having tangential engagement with the walls of the receptacle at that corner in which it is located whereby the springs centralize the false bottom with respect to the receptacle at all times.

In testimony whereof I affix my signature.

AARON D. SHREVE.

Copies of this patent may be obtained for five cents each, by addressing the "Commissioner of Patents Washington, D. C."